United States Patent
Murphy et al.

(10) Patent No.: US 8,695,626 B2
(45) Date of Patent: Apr. 15, 2014

(54) SYSTEMS AND METHODS FOR VALVE INSERTION AND LINESTOPPING

(75) Inventors: Kevin P. Murphy, Elk Grove Village, IL (US); Michael S. Murphy, Elk Grove Village, IL (US)

(73) Assignee: Advanced Valve Technologies, Inc., Elk Grove Village, IL (US)

( * ) Notice: Subject to any disclaimer, the term of this patent is extended or adjusted under 35 U.S.C. 154(b) by 471 days.

(21) Appl. No.: 12/977,845

(22) Filed: Dec. 23, 2010

(65) Prior Publication Data

US 2012/0160337 A1    Jun. 28, 2012

(51) Int. Cl.
 *F16L 43/00* (2006.01)
 *F16L 55/18* (2006.01)
 *F16L 55/124* (2006.01)

(52) U.S. Cl.
 USPC ............. 137/315.31; 137/317; 137/318

(58) Field of Classification Search
 USPC ............ 137/315.21, 315.27, 315.29, 315.31, 137/317, 318, 454.6; 33/520, 628, 633, 33/634, 638, 644
 See application file for complete search history.

(56) References Cited

U.S. PATENT DOCUMENTS

| | | | |
|---|---|---|---|
| 3,650,547 A | 3/1972 | Tickett | |
| 5,820,106 A * | 10/1998 | Wurangian | 251/326 |
| 6,283,446 B1 | 9/2001 | Sato et al. | |
| 6,308,726 B2 | 10/2001 | Sato et al. | |
| 6,357,471 B1 | 3/2002 | Sato et al. | |
| 6,416,263 B1 | 7/2002 | Sato | |
| 6,470,907 B1 | 10/2002 | Sato et al. | |
| 6,530,389 B2 | 3/2003 | Sato et al. | |
| 6,615,859 B2 | 9/2003 | Sato et al. | |
| 6,622,747 B2 | 9/2003 | Sato et al. | |
| 6,776,184 B1 * | 8/2004 | Maichel et al. | 137/318 |
| 7,363,935 B2 * | 4/2008 | Anderson et al. | 137/271 |
| 2006/0070659 A1 | 4/2006 | Nelson et al. | |

FOREIGN PATENT DOCUMENTS

| | | |
|---|---|---|
| CA | 2254656 | 8/1999 |
| DE | 69812316 T2 | 8/1999 |
| EP | 0935089 A1 | 8/1999 |
| MY | 119654 A | 6/2005 |

OTHER PUBLICATIONS

"Valve Insertion Made EZ" brochure printed Jun. 26, 2008, 2 pgs.

* cited by examiner

*Primary Examiner* — John K Fristoe, Jr.
*Assistant Examiner* — Kevin Barss
(74) *Attorney, Agent, or Firm* — Brinks Gilson & Lione (57) ABSTRACT

The present embodiments provide systems and methods for valve insertion and linestopping. In one embodiment, the system comprises a sealing housing having a lower housing portion and an upper housing portion that are each dimensioned to partially surround an exterior surface of an existing pipe in an airtight state. In one embodiment, an integral valve assembly is disposed at least partially within an integral valve housing section of the upper housing portion. The integral valve assembly comprises a valve movable between an open position in which the valve provides an open pathway through an opening in the upper housing portion, and a closed position in which the valve provides a seal adjacent to the opening. The upper housing portion may be adapted to selectively receive each of an adapter plate for a cutting machine, a valve bonnet, and a blind flange. Optionally, the valve bonnet and the gate may be removed from engagement with the upper housing portion when the valve of the integral valve assembly is in the closed position, and a blind flange may be secured to the upper housing portion after the valve bonnet and the gate are removed. Therefore, the user advantageously has an option of whether to leave the valve bonnet and the gate coupled to the sealing housing for certain applications, or may remove the valve bonnet and the gate for other applications.

20 Claims, 9 Drawing Sheets

SYSTEMS AND METHODS FOR VALVE INSERTION AND LINESTOPPING

BACKGROUND

The present embodiments relate generally to systems and methods for valve insertion and linestopping.

There are various instances in which it may become necessary or desirable to affect flow within an existing pipe, such as one that is subterraneously placed. Such pipes may carry gases, oil, water, or other fluids, and it may be desirable to temporarily or permanently stop the flow within the pipe.

Various valve insertion methods are known for inserting a valve in a line of an existing pipe. In general, a sealing housing having first and second portions may be coupled around an exterior surface of the existing pipe. A slit may be made into the existing pipe using a cutting machine without stopping passage of fluid. A gate, or sluice valve, is inserted into the slit portion of the existing pipe. The gate may be advanced to a position in which is inhibits flow through the existing pipe.

In various systems, a relatively large excavation is required in order to access the existing pipe and perform various operations. Moreover, the cutting machine generally either cuts an entire section of the pipe, or a section that is about 180 degrees along the upper surface of the pipe, prior to insertion of the gate. However, such large cuts to the pipe may adversely affect the integrity of the pipe.

Additionally, it may be difficult to attach a valve bonnet and a gate to the existing pipe after a cut is formed into the existing pipe. Still further, it also may be difficult or impossible to remove the valve bonnet and gate after a desired operation is performed. In some situations, a relatively expensive valve bonnet and gate therefore remain coupled to the existing pipe even in situations where it was only necessary to perform a relatively brief, single linestop.

SUMMARY

The present embodiments provide systems and methods for valve insertion and linestopping. In one embodiment, the system comprises a sealing housing having a lower housing portion and an upper housing portion that are each dimensioned to partially surround an exterior surface of an existing pipe, where the sealing housing extends across at least two outer, spaced apart circumferences of the existing pipe. A plurality of sealing members contact the existing pipe about at least two outer circumferences of the existing pipe at locations spaced apart in the longitudinal direction of the existing pipe to enclose a part of the existing pipe in an airtight state.

In one embodiment, the upper housing portion comprises an integral valve assembly disposed at least partially within an integral valve housing section of the upper housing portion. The integral valve assembly comprises a valve movable between an open position in which the valve provides an open pathway through an opening in an upper surface of the upper housing portion and a closed position in which the valve provides a seal adjacent to the opening.

In use, the upper housing portion is adapted to selectively receive each of an adapter plate for a cutting machine, a valve bonnet, and a blind flange. The valve bonnet may be secured to the upper housing portion with the valve of the integral valve assembly in the closed position, after a slit has been formed in the existing pipe. The valve of the integral valve assembly then may be moved between the closed position and the open position after the valve bonnet is secured to the upper housing portion. A gate disposed within the valve bonnet may be moved in radial directions relative to the slit in the existing pipe between an open position in which flow is permitted through the existing pipe and a closed position in which flow is inhibited through the existing pipe.

Optionally, the valve bonnet and the gate may be removed from engagement with the upper housing portion when the valve of the integral valve assembly is in the closed position. The blind flange may be secured to the upper housing portion after the valve bonnet and the gate are removed from engagement with the upper housing portion. Therefore, the user advantageously has an option of whether to leave the valve bonnet and the gate coupled to the sealing housing for certain applications, or may remove the valve bonnet and the gate for other applications.

Other systems, methods, features and advantages of the invention will be, or will become, apparent to one with skill in the art upon examination of the following figures and detailed description. It is intended that all such additional systems, methods, features and advantages be within the scope of the invention, and be encompassed by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1A:
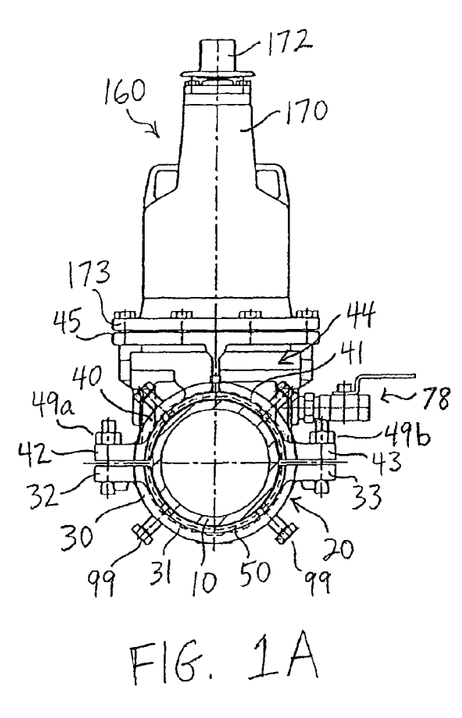
FIGS. 1A-1B are front and rear views, respectively, of a sealing housing coupled to an existing pipe, and a valve bonnet coupled to the sealing housing, with selected components shown in cross-section for illustrative purposes.
Figure 1B:
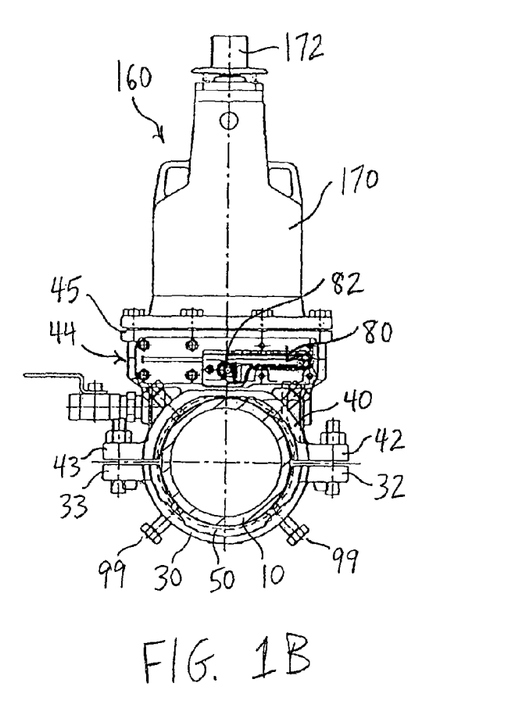

Referring now to FIGS. 1A-1B, a first embodiment of a system for use with an existing pipe 10 is described. The system comprises a sealing housing 20, which includes a lower housing portion 30 and an upper housing portion 40. The lower and upper housing portions 30 and 40 each partially surround an exterior surface of the pipe 10, and are designed and dimensioned to enclose and seal up, in an airtight state, two portions of the existing pipe 10 along its axial length.

In FIG. 1, a valve bonnet 170 is shown coupled to the upper housing portion 40. As will be explained further below, each of an adapter plate 140 for a cutting machine 150, the valve bonnet 170, and a blind flange 190 may be selectively coupled to an upper surface 45 of the upper housing portion 40, as needed, to perform various functions in connection with installation and operation of the system.

Figure 2:
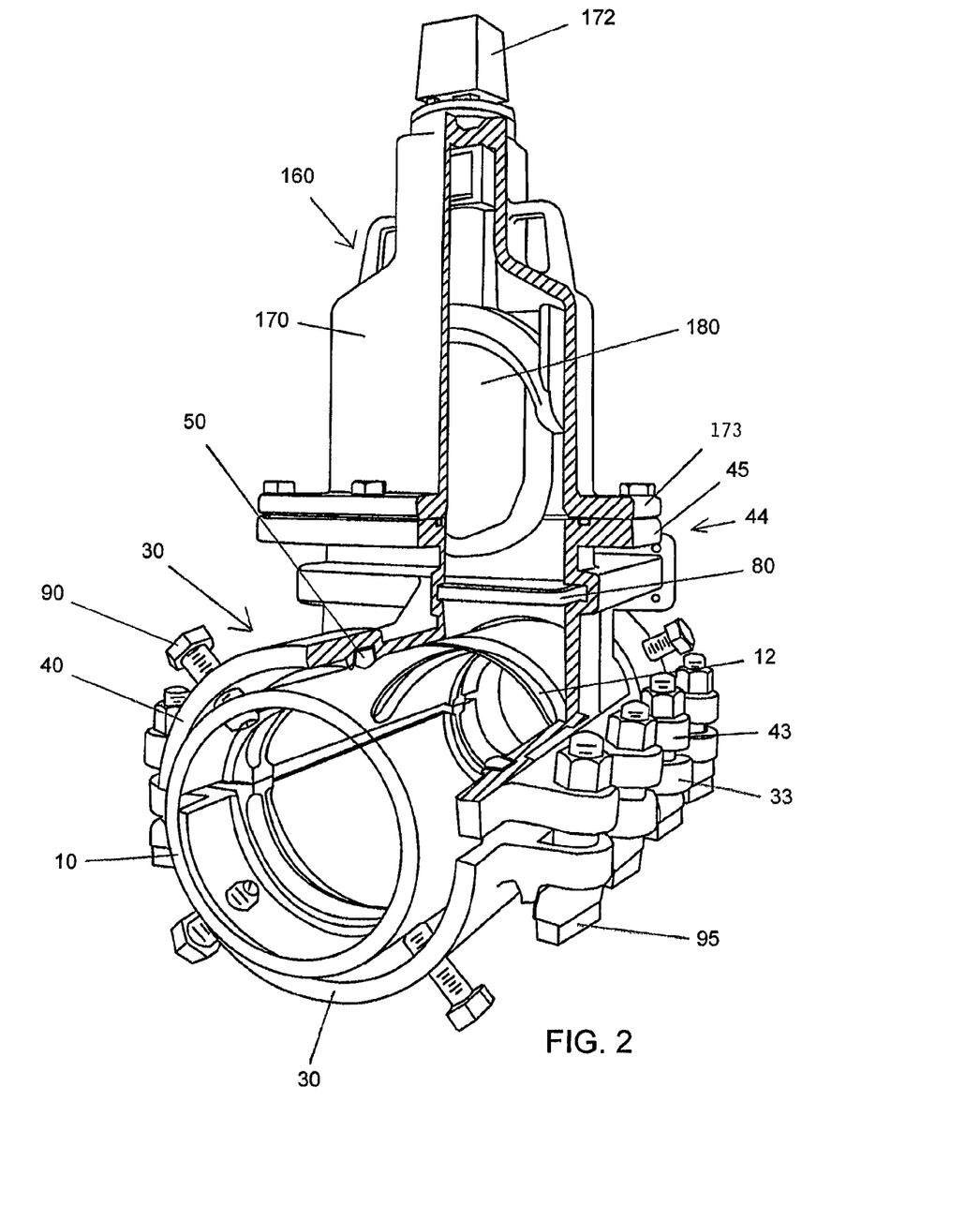
FIG. 2 is a partial cut-away view of the sealing assembly of FIG. 1 coupled to the existing pipe, and the valve bonnet coupled to the sealing housing.

The lower housing portion 30 is generally disposed below the upper housing portion 40 when the lower and upper housing portions 30 and 40 are assembled as shown in FIGS. 1-2. While the terms "upper" and "lower" housing portions are used herein, the upper housing portion 40 does not need to be entirely vertically above the lower housing portion 30 in all applications.

The lower housing portion 30 comprises a main body 31 that is adapted to encircle a portion of the pipe 10, and has coupling regions 32 and 33 that may extend radially outward relative to the pipe 10, as shown in FIGS. 1A-1B. Similarly, the upper housing portion 40 comprises a main body 41 that is adapted to encircle a portion of the pipe 10, and coupling regions 42 and 43 that may extend radially outward relative to the pipe 10 and are designed to overlay the coupling regions 32 and 33, respectively, of the lower housing portion 30. The coupling regions 32, 33, 42 and 43 may comprise bores that are dimensioned to receive a securing member, such as a bolt forming part of nut and bolt assemblies 49a and 49b. When assembled, the nut and bolt assembly 49a secures the coupling region 32 of the lower housing portion 30 to the coupling region 42 of the upper housing portion 40, while the nut and bolt assembly 49b secures the coupling region 33 of the lower housing portion 30 to the coupling region 43 of the upper housing portion 40, thereby securing the lower and upper portions 30 and 40 of the sealing housing 20 circumferentially around the pipe 10. Optionally, sacrificial anodes 95 may be provided on the nut and bolt assemblies 49a and 49b as shown in FIG. 2.

Figure 3:
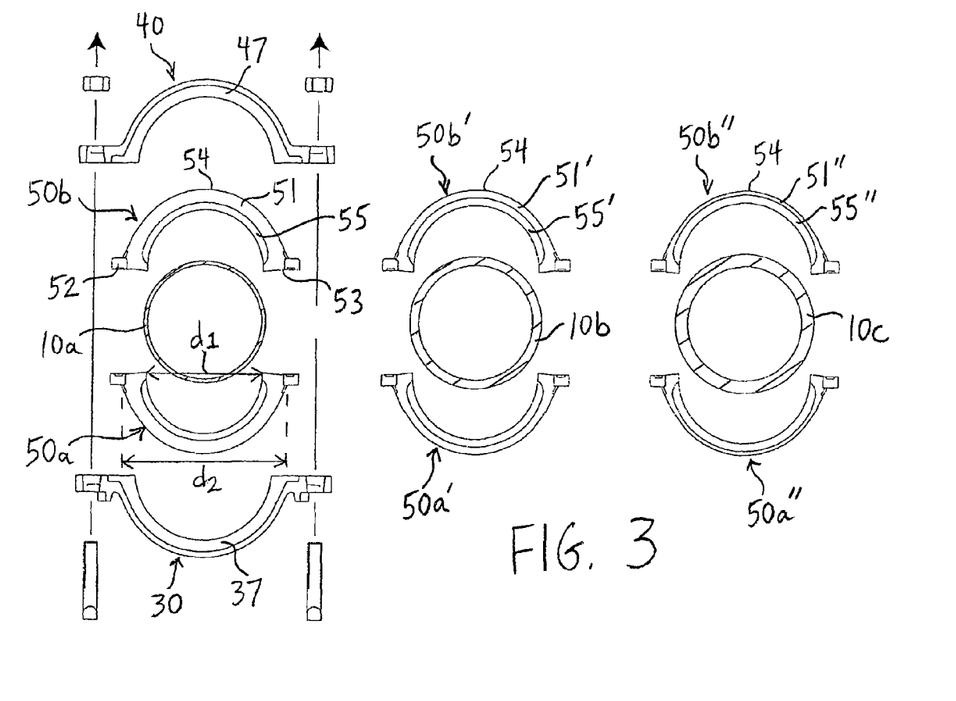
FIG. 3 illustrates schematic, exploded views of dimensions of sealing members relative to existing pipes.

The lower and upper housing portions 30 and 40 are configured to receive a plurality of sealing members 50 to form a fluid seal between the lower and upper housing portions 30 and 40 and the exterior surface of the pipe 10, as shown in FIGS. 1-2 and described further in FIG. 3. In one example, the sealing members 50 are in the form of gaskets 50. First and second gasket pairings may be used, and are positioned to encircle the pipe 10 on opposing sides of a slit 12 formed in the pipe 10, as shown in FIG. 2. In other words, a plurality of sealing members 50 contact the existing pipe 10 about at least two outer circumferences of the existing pipe 10 at locations spaced apart in the longitudinal direction L of the existing pipe 10 to enclose a part of the existing pipe 10 in an airtight state.

Referring to FIG. 3, a single pair of lower and upper housing portions 30 and 40, together with various pairs of sealing members 50, are designed to work in conjunction with pipes 10a-10c of different outer diameters. In FIG. 3, a first pipe 10a has a smaller outer diameter than a second pipe 10b, which in turn has a smaller outer diameter than a third pipe 10c. Advantageously, the same pair of lower and upper housing portions 30 and 40 may be used on any of the first, second and third pipes 10a-10c, i.e., irrespective of their outer diameters, which provides significant advantages because a user does not need to know the exact outer diameter in advance of excavation of the pipes. In other words, a user may learn of the outer diameter of the pipe on site and promptly use the same pair of lower and upper housing portions 30 and 40, while simply selecting the appropriate sealing members.

In FIG. 3, sealing members in the form of a first gasket set having gaskets 50a and 50b are provided and designed for use with the first pipe 10a of the smallest outer diameter. The gaskets 50a and 50b each comprise a main body 51 having end regions 52 and 53 that extend laterally away from the pipe 10a, and further have an outer surface 54 having a generally concave shape relative to the pipe 10a. At least a portion of the outer surface 54 and the end regions 52 and 53 of the gasket 50a are dimensioned to fit inside of a gasket channel 37 in the lower housing portion 30. The gasket 50b is similarly dimensioned and fits inside of a gasket channel 47 in the upper housing portion 40.

The gaskets 50a and 50b each comprise a curved recess 55 formed into the main body at a location spaced apart from the outer surface 54, as shown in FIG. 3. An inner diameter $d_1$ varies amongst the gaskets 50a and 50b, 50a' and 50b', and 50a" and 50b". Specifically, the inner diameter $d_1$ of the gaskets 50a and 50b is less than the inner diameter of the gaskets 50a' and 50b', and the inner diameter of the gaskets 50a' and 50b' is in turn less than the inner diameter of the gaskets 50a" and 50b". As the inner diameter $d_1$ of the gaskets becomes larger, the curved recess 55 is pushed further outward, thus reducing the thickness of the main body 51 between the curved recess 55 and the outer surface 54. Thus, the main body 51 of gaskets 50a and 50b has the greatest thickness as determined between the curved recess 55 and the outer surface 54, while the main body 51' of gaskets 50a' and 50b' has an intermediate thickness as determined between the curved recess 55' and the outer surface 54, and the main body 51" of gaskets 50a" and 50b" has the smallest thickness as determined between the curved recess 55" and the outer surface 54, as shown in FIG. 3.

In this manner, the inner diameter $d_1$ of the gaskets 50a and 50b allows a secure fit around the pipe 10a having the smaller outer diameter, the inner diameter of the gaskets 50a' and 50b' allows a secure fit around the pipe 10b having an intermediate outer diameter, and the inner diameter of the gaskets 50a" and 50b" allows a secure fit around the pipe 10c having the largest outer diameter.

Notably, an outer diameter $d_2$ stays the same for each gasket 50a, 50b, 50a', 50b', 50a" and 50b". Accordingly, all of the gaskets 50a, 50b, 50a', 50b', 50a" and 50b" fit in the gasket recesses 37 and 47 of the lower and upper housing portions 30 and 40, respectively. Advantageously, all of the different seals shown may be used with the same pair of lower and upper housing portions 30 and 40.

In one exemplary system, a kit is provided to a user that comprises the lower and upper housing portions 30 and 40, along with a plurality of gasket pairs of different sizes. A user preferably knows the inner diameter of the pipe, but does not need to know the wall thickness of the pipe or the exact outer diameter of the pipe in advance of excavation of the pipes. When a user learns of the outer diameter of the pipe on site, the user may select and use the proper gasket pairing that fits the particular outer diameter of the pipe, as shown in FIG. 3.

In one example, where a pipe 10 has an inner diameter of 4 inches, the outer diameters of the pipes 10a-10c may vary between 4.5 inches and 5.6 inches, depending on the thickness of the pipe. Only one pair of upper and lower housing portions 30 and 40 is needed for the pipes 10a-10c having the inner diameter of 4 inches, regardless of the variations in wall thickness, because the plurality of gasket pairs of different sizes 50*a*, 50*b*, 50*a'*, 50*b'*, 50*a"* and 50*b"* can compensate for the different outer diameters ranging between 4.5 inches and 5.6 inches. In further examples, progressively larger pairs of lower and upper housing portions 30 and 40 may be provided for applications where alternative pipes comprise inner diameters with dimensions of 6, 8, 10 and 12 inches. Even if these alternative pipes comprise variable outer diameters based on their wall thicknesses, the plurality of gasket pairs of different sizes provided can compensate for such variation. It should be noted that while exemplary pipe dimensions are provided, the systems and methods described herein may be used in conjunction with an array of pipes of different dimensions.

Figure 4:
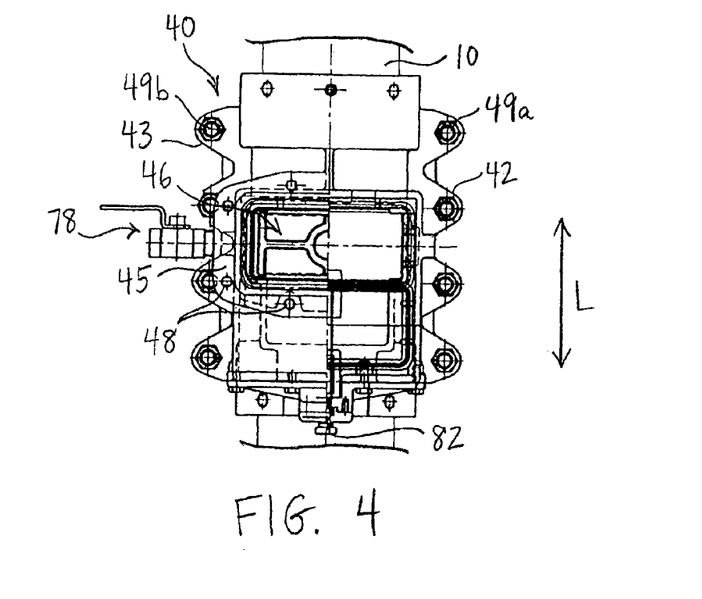
FIG. 4 is a top view, partially cut-away, illustrating features of an upper housing portion of the sealing housing of FIGS. 1-2.
Figure 5A:
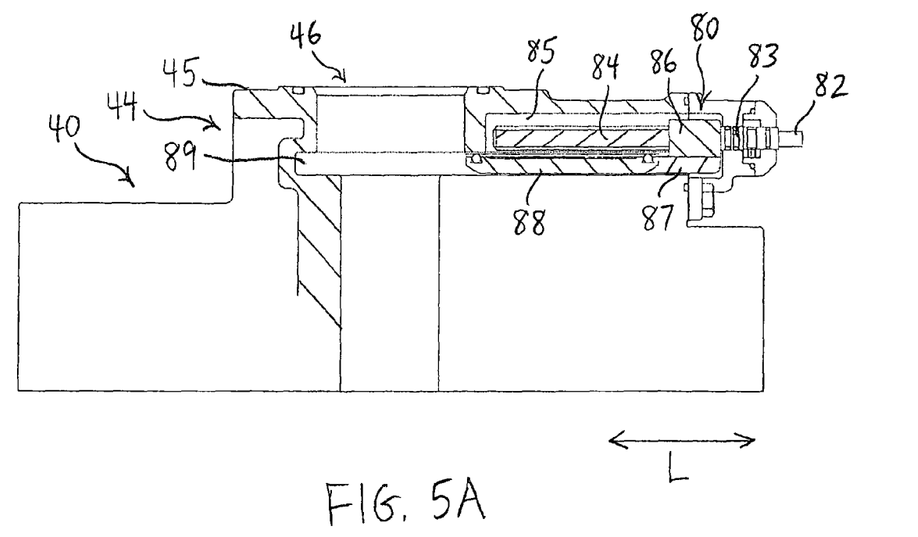
FIGS. 5A-5B are side-sectional views illustrating movement of a valve of an integral valve assembly between open and closed positions, respectively.
Figure 5B:
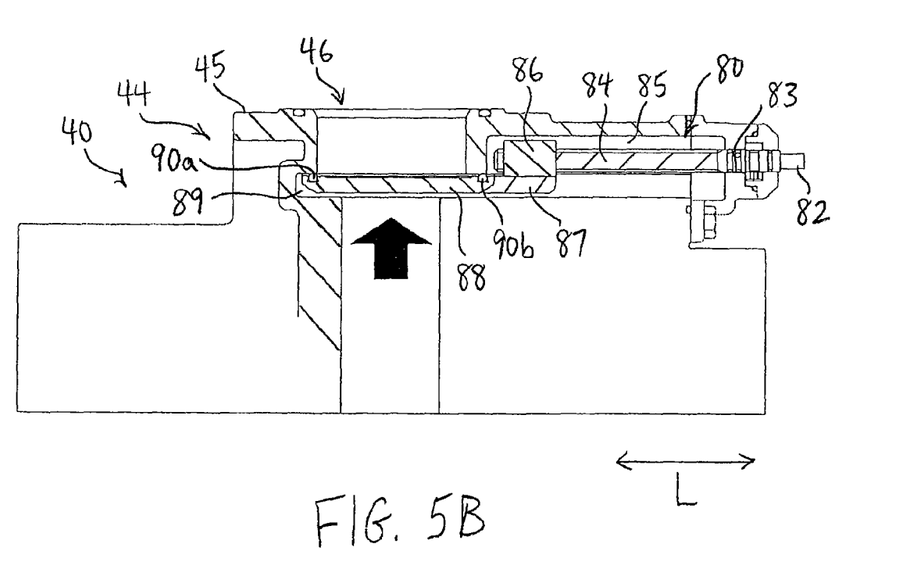

Referring back to FIGS. 1-2, in conjunction with FIGS. 4-5, further features of the upper housing portion 40 are shown and described. The upper housing portion 40 comprises a main body 41 that is adapted to encircle a portion of the pipe 10, an upper surface 45, and an integral valve housing section 44 disposed generally therebetween. The integral valve housing section 44 is elevated relative to the pipe 10, and is designed to accommodate an integral valve assembly 80 positioned therein, as explained further below.

As seen in FIG. 4, the upper surface 45 of the upper housing portion 40 comprises an opening 46 formed therein. The opening 46 comprises a generally rectangular shape, which in this embodiment, has a shorter length along the longitudinal axis L of the pipe 10 relative to its width as measured laterally across the pipe. The upper surface 45 comprises a plurality of bores 48 disposed around the perimeter of the opening 46, which permit a plurality of components to be coupled to the upper surface 45 of the upper housing portion 40. In particular, each of a valve bonnet 170, an adapter plate 140 for a cutting machine 150, and a blind flange 190 may be selectively coupled to the upper surface 45 of the upper housing portion 40, via the bores 48, at a position overlapping the opening 46, as explained in further detail below.

Referring to FIGS. 5A-5B, further features of the integral valve housing section 44, together with the integral valve assembly 80, are shown in a schematic representation of operation. The integral valve assembly 80 comprises a valve 88, which is configured for axial movement along the longitudinal axis L of the pipe 10. In one embodiment, the valve 88 comprises a generally flat rectangular-shaped plate member, however, alternative shapes such as circular and elliptical valves, as well as non-flat valves, may be used without departing from the spirit of the present embodiments.

The valve 88 of the integral valve assembly 80 is movable between an open position in which the valve 88 provides an open pathway through the opening 46, as shown in FIG. 5A, and a closed position in which the valve 88 provides a seal adjacent to the opening 46, as shown in FIG. 5B. An actuation assembly is provided to move the valve 88 between the open and closed positions. In one example, the actuation assembly comprises a linear actuator that, when driven by a non-linear motion, creates linear motion. For example, rotation of a feed screw 82 that is accessible to a user outside of the first housing portion 40 may impart a linear motion to the valve 88 via linking elements 83.

In one example of a linear actuator, rotation of the feed screw 82 in a first direction linearly advances a block member 86 along a guide member 84, which is disposed within a slotted section 85 of the upper housing portion 40. The block member 86 is coupled to the valve 88 by a linkage 87, which may be integral with the valve and/or block member 86, or externally coupled thereto. As the feed screw 82 is rotated in the first direction, block member 86 is advanced in a direction from close proximity to the feed screw 82 towards the opening 46, thereby linearly advancing the valve 88 within a slot 89 until the valve 88 is disposed immediately beneath the opening 46 and spanning the entire surface area of the opening 46, as shown in FIG. 5B. In this closed position, fluid flow is inhibited in a direction from the slit 12 in the pipe 10 upwards towards the opening 46.

Conversely, rotation of the feed screw 82 in a second, opposing direction linearly retracts the block member 86 along the guide member 84 in a direction from the opening 46 towards the feed screw 82. The valve 88 may be moved in this linear direction until it reaches the open position shown in FIG. 5A.

Referring now to FIGS. 6A-6F, additional components and selected exemplary method steps are explained in connection with certain functions of the assembly of the present embodiments. It should be noted that the pipe 10 may be part of a distribution system for water, oil, gas, and the like. The pipe 10 may be subterraneously positioned to protect it from damage. In order to access the pipe 10 and perform the functions herein, the pipe 10 must be exposed via a sufficiently sized excavation into the ground. The excavation may be accomplished by any suitable technique, and a clearance as low as 13 inches is required to perform the installation of the sealing housing 20 described herein. Once the pipe 10 is exposed, it is cleaned in order to remove any dirt on the pipe.

In preliminary steps, tape may be applied around the pipe 10 at locations corresponding to placement of the sealing members 50 described in FIGS. 1-3 above. The sealing members 50 and the tape around the pipe 10 then may be coated with a lubricant that will facilitate rotational movement of the lower and upper housing portions 30 and 40 with respect to the pipe 10 during the cutting operation noted in FIGS. 6C-6D below.

In next steps, the sealing housing 20 is installed around the pipe 10, with the sealing members 50*a* and 50*b* being disposed in the gasket channels 37 and 47 of the lower and upper housing portions 30 and 40, respectively. A first set of sealing members 50*a* and 50*b* is provided around the circumference of the pipe 10 at a first axial location, and a second set of sealing members 50*a* and 50*b* are provided around the circumference of the pipe 10 at a second axial location that is spaced apart in the longitudinal direction relative to the first axial location.

The coupling regions 32, 33, 42 and 43 of the lower and upper housing portions 30 and 40 are secured together, e.g., using the nut and bolt assemblies 49*a* and 49*b* described in FIG. 1A. At this time, the lower and upper housing portions 30 and 40 are secured to one another around the perimeter of the pipe 10, with the sealing members 50 in contact around the perimeter of the pipe 10 along at least two spaced-apart axial locations.

In a next step, a rotary feed drive unit (not shown) may be installed around the pipe 10 adjacent to the sealing housing 20, on the side of the sealing housing 20 that does not have the feed screw 82 projecting outward therefrom. The rotary feed drive unit may be used to actuate the cutting machine 150 of FIGS. 6A-6F, as explained further below.

In a further step, a workman ensures that the sealing housing 20 is mounted level with respect to the pipe 10. In particular, the upper surface 45 of the upper housing portion 40 should be facing directly upward. A diagnostic tool, such as a level, may be placed atop the upper surface 45 of the upper housing portion 40 to ensure it is in a level position before the cutting operation is performed.

Figure 6A:
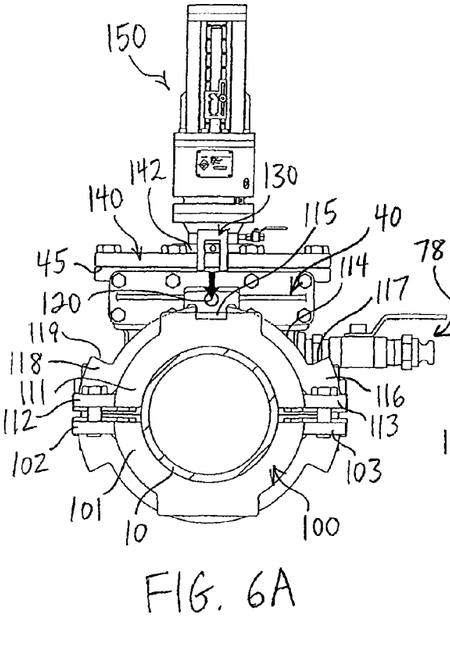
FIGS. 6A-6F are rear views illustrating exemplary method steps in connection with performing a cutting operation, with selected components shown in cross-section for illustrative purposes.

Referring to FIG. 6A, after the preliminary steps outlined above are performed to secure the sealing housing 20 around the pipe 10 in a level manner, a travel limiter end ring 100 is secured around the pipe 10 adjacent to the sealing housing 20, on the side of the sealing housing 20 that has the feed screw 82 projecting outward therefrom. The travel limiter end ring 100 has lower and upper portions 101 and 111, respectively. The lower portion 101 of the travel limiter end ring 100 has coupling regions 102 and 103, while the upper portion 111 has coupling regions 112 and 113, as shown in FIG. 6A. When placed around the pipe 10, the coupling regions 102, 103, 112 and 113 are then coupled together, e.g., using nut and bolt assemblies, thereby securing the lower and upper portions 101 and 111 of the travel limiter end ring 100 around the pipe 10, as shown in FIG. 6A.

The upper portion 111 of the travel limiter end ring 100 comprises a main body 114 having a notched region 115 for receipt of a U-gage 130, as explained further below, and further comprises first and second end stops 116 and 118, respectively. The notched region 115 forms an indentation relative to the main body 114, while the first and second end stops 116 and 118 protrude radially outward relative to the main body 114, as shown in FIG. 6A. An inner surface 117 of the first end stop 116 is positioned 120 degrees apart from an inner surface 119 of the second end stop 118, as depicted in FIG. 6A, thereby allowing for a precise 120 degree cut into the pipe as explained in FIGS. 6C-6D below.

It should be noted that, in the embodiment depicted in FIGS. 6A-6F, the main body 114, the notched region 115 and the first and second end stops 116 and 117 are formed from a plate of material that is externally coupled to the upper portion 111 of the travel limiter end ring 100. Alternatively, the main body 114, the notched region 115 and the first and second end stops 116 and 117 may be integrally formed with the upper portion 111 of the travel limiter end ring 100.

In one embodiment, a travel indicator pin 120 may be coupled to the feed screw 82 of the valve assembly 80, as depicted in FIG. 6A. As noted above, the feed screw 82 is accessible to a user outside of the first housing portion 40, and is positioned in a direction facing the travel limiter end ring 100. The travel indicator pin 120 may be coupled to an exterior surface of the feed screw 82 in an any suitable manner, including but not limited to using integral screws or pins, or using a threaded engagement. In effect, the travel indicator pin 120 provides an axial and/or radial extension of the feed screw after the travel limiter end ring 100 is secured to the pipe 10 adjacent to the sealing housing 20.

Figure 6B:
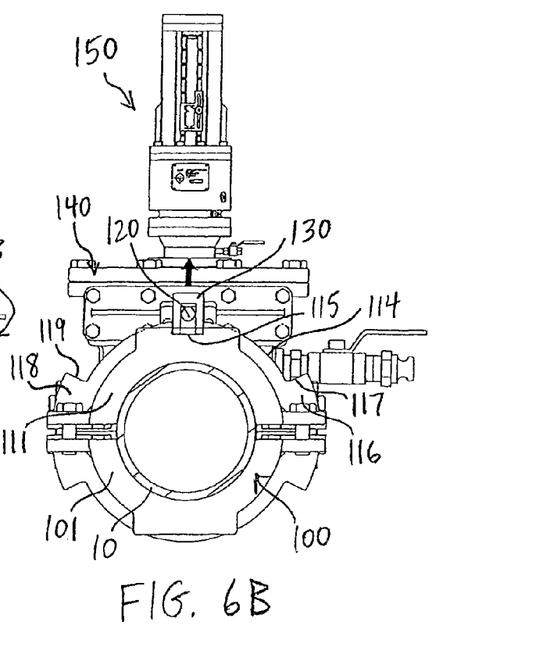

Referring to FIG. 6B, the U-gage 130 is used for further alignment purposes. Advantageously, the U-gage 130 centers the travel indicator pin 120 with respect to the notched region 115 as shown in FIG. 6B, thereby assuring that the slit 12 formed in the pipe 10 during the cutting step of FIGS. 6C-6D will be aligned with the gate 180 in the valve bonnet 170 when the valve bonnet 170 is coupled to the upper housing portion 40, as explained further below.

A chip flush fitting and valve 78 is installed into a tapped hole formed in the upper housing portion 40, as depicted in FIG. 6A. The chip flush fitting and valve 78 removes the chips created by the end mill cutting process described in FIGS. 6C-6D below. It should be noted that the chip flush fitting and valve 78 may be provided on either side of the upper housing portion 40, and is shown on a different side of the upper housing portion 40 in FIGS. 6A-6F, as compared to FIGS. 1 and 4, for illustrative purposes only.

A cutting adapter plate 140 is mounted to the plurality of bores 48, seen in FIG. 4, that are disposed around the perimeter of the opening 46 in the upper surface 45 of the upper housing portion 40. The cutting adapter plate 140 comprises a bore that overlays the opening 46 of the upper housing portion 40. The cutting adapter plate also comprises a receiving portion 142 for securely engaging a cutting machine 150.

Prior to mounting the cutting machine 150 to the receiving portion 142 of the cutting adapter plate 140, the unit may be filled with water for hydrostatic pressure testing. After the cutting machine 150 is attached, hydrostatic pressure testing may be performed at about 1.5 times the system operating pressure.

Exemplary cutting machines and related tools are shown in U.S. Pat. No. 6,470,907, which is hereby incorporated by reference in its entirety. In one presently preferred example, the cutting machine 150 may comprise a replaceable carbide cutting head.

Figure 6C:
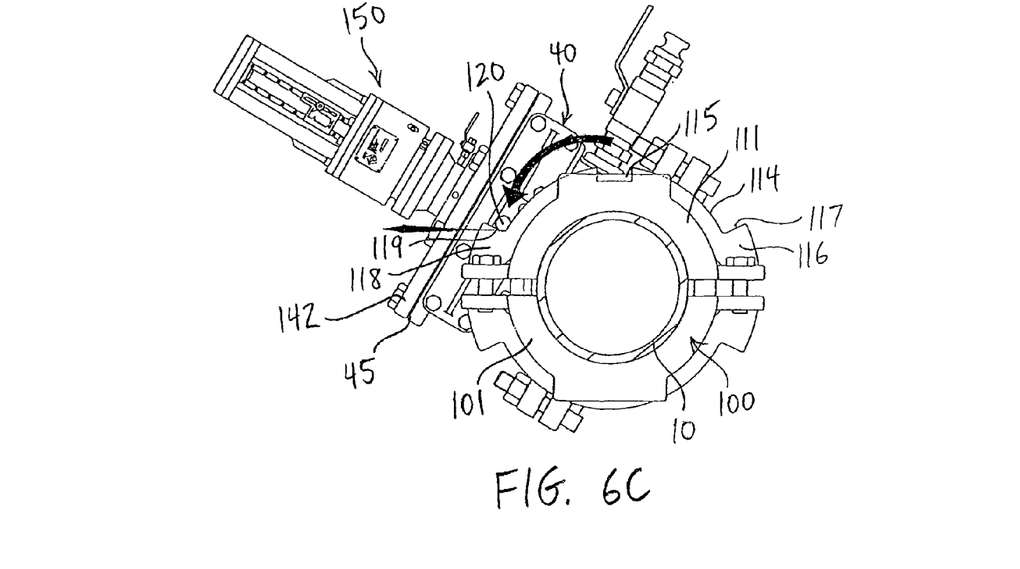

Referring to FIG. 6C, after successful hydrostatic pressure testing, the sealing housing 20 with the cutting machine 150 coupled thereto is rotated until the travel indicator pin 120 touches the inner surface 119 of the second end stop 118 of the travel limiter end ring 100. The cutting head of the cutting machine 150 is advanced until it makes contact with an outside surface of the pipe 10, and then is advanced into and through the pipe 10. Measurement indicia may be used to determine a proper depth of insertion of the cutting head into the pipe.

Figure 6D:
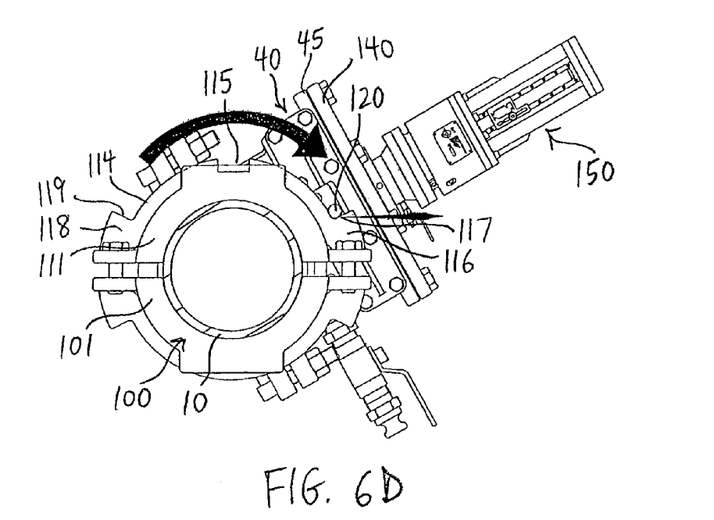

Referring to FIG. 6D, the seal housing 20 with the cutting machine 150 attached then are rotated in tandem until the travel indicator pin 120 has moved from the inner surface 119 of the second end stop 118 of the travel limiter end ring 100, along the main body 114, and to the inner surface 117 of the first end stop 116, as depicted in FIG. 6D. As noted above, a rotary feed drive unit installed around the pipe 10 adjacent to the assembly 20, on the side of the sealing housing 20 that does not have the feed screw 82 projecting outward therefrom, may be used to actuate the cutting machine 150 using hydraulic, pneumatic or electric motor drives.

Advantageously, the first and second end stops 116 and 118 ensure that the slit 12 formed in the pipe 10 is precisely 120 degrees across the upper surface of the pipe, as illustrated from a cross-sectional view shown in FIG. 7A below. In one example, only a 1.625 inch width slit is milled into the pipe, and such a thin slit coupled with only a 120 degree cut across the top of the pipe helps maintain pipeline integrity. While a 120 degree cut is explained for discussion purposes, the cut may be greater or less than 120 degrees.

It is possible to remove chips during the cutting process via the chip flush fitting and valve 78. For example, as described in U.S. Pat. No. 6,283,446, which is hereby incorporated by reference in its entirety, apparatus and methods are described that discharge chips as a result of cutting the wall of the pipe from an outlet port together with the water flowing through the outlet port under pressure.

Figure 6E:
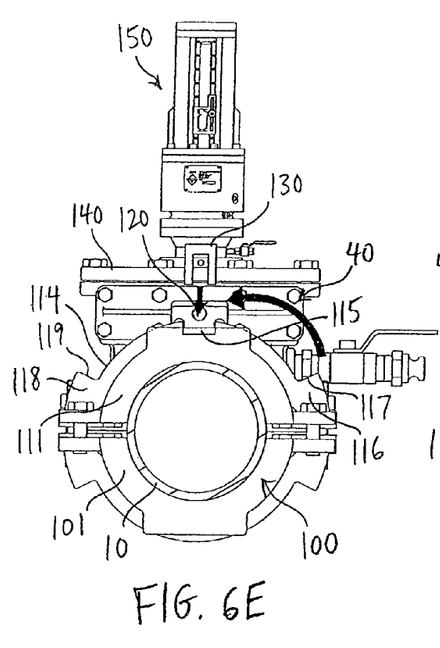
Figure 6F:
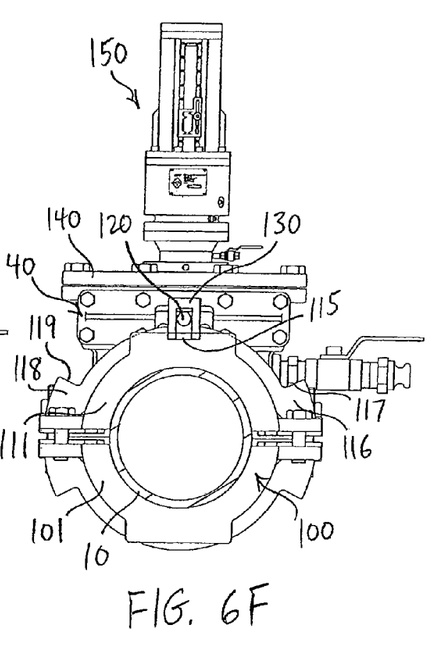

Referring to FIG. 6E, after the travel indicator pin 120 completes its path, the cutting head is retracted, and the sealing housing 20 with the cutting machine 150 coupled thereto are rotated in tandem back to a level position. The U-gage 130 is then used again to ensure that the level position of the sealing housing 20 is achieved, as shown in FIG. 6F.

In a next step, the valve 88 of the integral valve assembly 80 then is moved between the open and closed positions shown in FIGS. 5A and 5B, respectively. In particular, the feed screw 82 is rotated to impart a linear motion to the valve 88, as explained above. Optionally, the travel indicator pin 120 may still be attached to the feed screw 82 during the actuation of the valve 88, and therefore the travel indicator pin 120 may be rotated by the workman to effect rotation of the feed screw 82.

In the closed position of FIG. 5B, the valve 88 inhibits flow through the opening 46 in the upper surface 45 of the sealing housing 20. Thus, fluid from the pipe 10, which may escape via the slit 12 formed in the upper surface of the pipe 10, cannot escape from the sealing housing 20 due to the valve 88 being in the closed position. Sealing members 90a and 90b may be coupled to the valve 88, as shown in FIG. 5B, to help ensure an enhanced seal.

In a next step, with the valve 88 of the integral valve assembly 80 closed, the cutting machine 150 then is removed from engagement with the receiving portion 142 of the cutting adapter plate 140. Subsequently, the cutting adapter plate 140 is removed from engagement with the upper surface 45 of the upper housing portion 40 of the sealing housing 20.

Figure 7A:
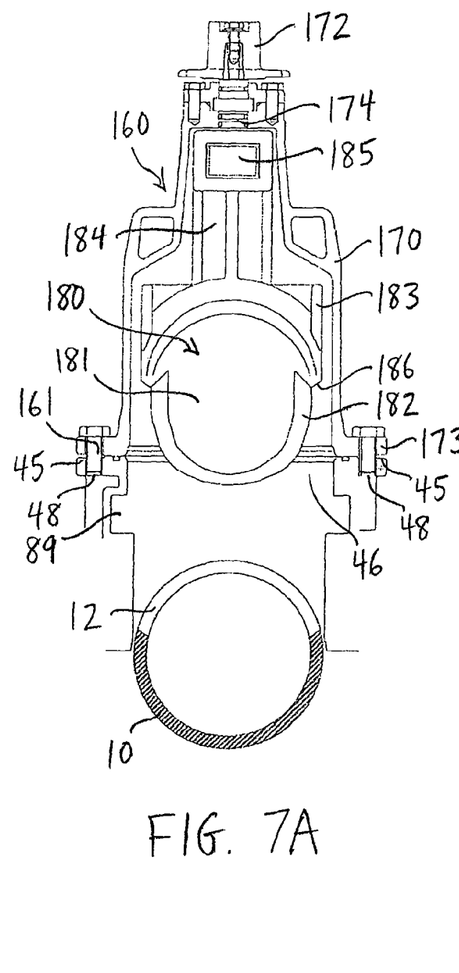
FIGS. 7A-7B are cross-sectional and side-sectional views, respectively, illustrating a sealing housing coupled to an existing pipe, and a valve bonnet coupled to the sealing housing, with a gate in an open position.
Figure 7B:
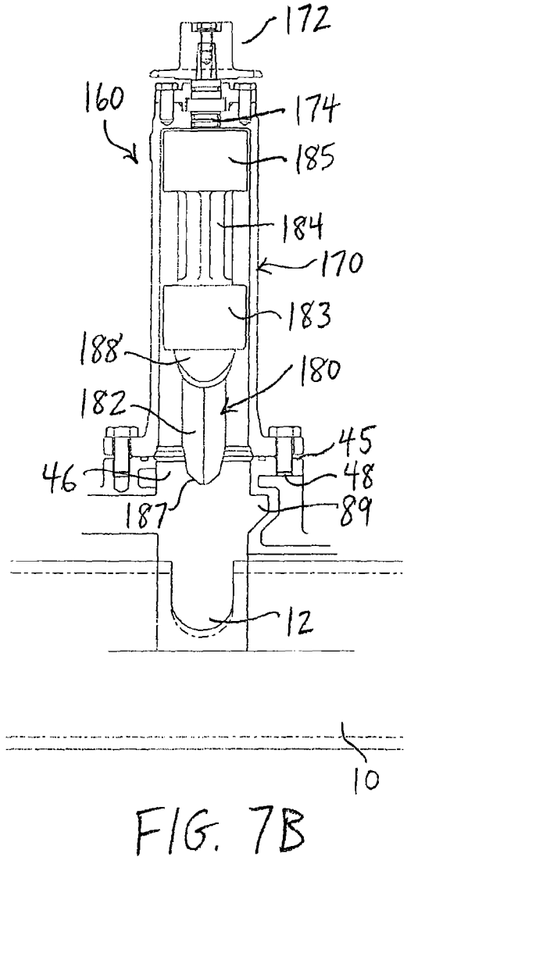
Figure 8A:
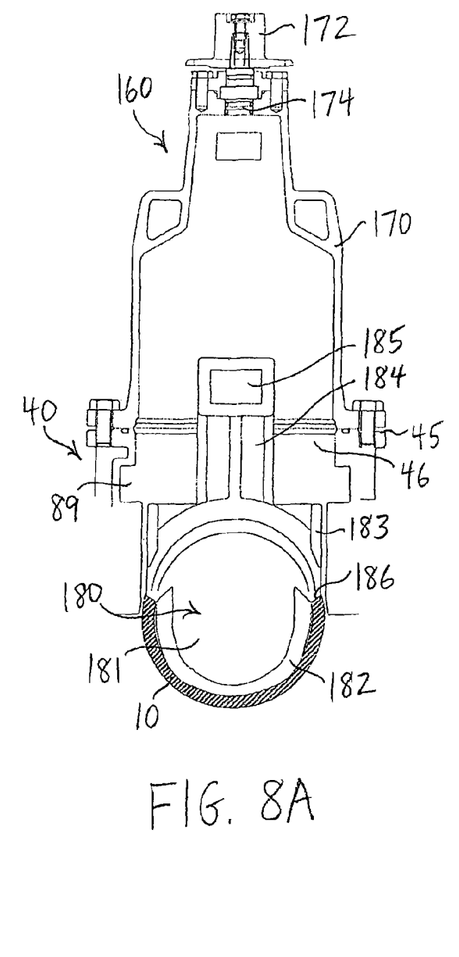
FIGS. 8A-8B are cross-sectional and side-sectional views, respectively, illustrating a sealing housing coupled to an existing pipe, and a valve bonnet coupled to the sealing housing, with the gate in a closed position.
Figure 8B:
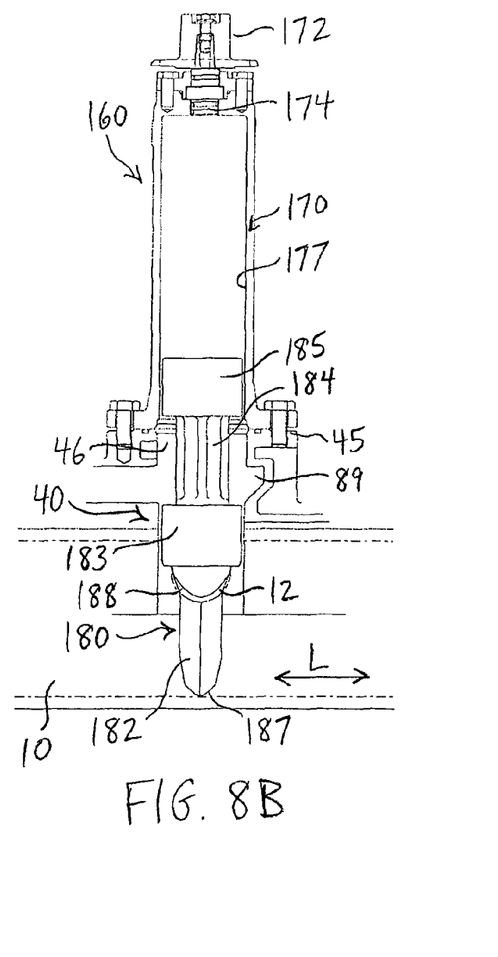

Referring now to FIGS. 7-8, together with FIGS. 1-2 above, a valve assembly 160 having a valve bonnet 170 and gate 180 may be mounted to the upper housing portion 40 of the sealing housing 20 after the steps of FIGS. 6A-6F are completed. In particular, the valve bonnet 170 may comprise a base portion 173 that has a plurality of bores that overlap with the plurality of bores 48 formed in the upper surface 45 of the upper housing portion 40, as depicted in FIGS. 7A-7B. The base portion 173 of the valve bonnet 170 may be fixed to the upper housing portion 40 by assembling bolts 161 that go through the plurality of bores 48.

Upon secure coupling of the valve bonnet 170 to the upper housing portion 40, the valve 88 of the integral valve assembly 80 is moved from the closed position of FIG. 5B to the open position of FIG. 5A via actuation of the feed screw 82, as explained in detail above. In FIGS. 7A-7B, the valve 88 is shown removed from its slot 89, such that the gate 180 is ready to be advanced through the opening 46 in the upper surface 45 of the upper housing portion 40.

The gate 180 is pre-housed within the valve bonnet 170, as shown in FIG. 7A. A valve spindle 174, coupled to an actuator 172, is adapted to slide the gate 180 in a direction that crosses the flow passage within the pipe 10 at right angles thereto. The gate 180 is moved in a downward direction, in the embodiment shown herein, if the valve actuator 172 is turned. The gate 180 invades the inside of the existing pipe 10 through the slit 12.

In a preferred series of method steps, the gate 180 is run about 67% of the way into the interior of the pipe 10, which is enough to hold the valve in place while any necessary final tightening procedures are performed. For example, it may be desirable to further tighten the nut and bolt assemblies 49a and 49b described in FIG. 1A, as necessary, to ensure proper final securement of the lower and upper housing portions 30 and 40 to one another around the perimeter of the pipe 10. In a next step, the rotary feed drive unit used to actuate the cutting machine may be removed from engagement around the exterior of the pipe 10. Similarly, the travel limiter end ring 100 of FIGS. 6A-6F is removed from engagement around the exterior of the pipe 10. In effect, only the sealing housing 20 is disposed in surrounding engagement with the exterior of the pipe 10. A plurality of restraint bolts 99, shown in FIGS. 1-2 and 9-10, then are advanced through internal threading in both the lower and upper housing portions 30 and 30 to securely restrain the sealing housing 20 relative to the perimeter of the pipe 10. Subsequently, the actuator 172 is further actuated to cause the gate 100 to extend fully into the interior of the pipe 10 to seal off flow within the pipe 10, as shown in FIGS. 8A-8B. In a next step, the chip flush fitting and valve 78 may be removed from the tapped hole formed in the upper housing portion 40 and a sealing plug 193, shown in FIGS. 9-10 below, is inserted into the tapped hole.

While various preferred method steps have been described, it will be appreciated that the steps listed herein need not necessary be performed in the particular order listed above. Certain sequences of steps may be performed in different orders or modified without departing from the spirit of the present embodiments.

In one exemplary embodiment, the gate 180 comprises a ductile iron material plus a rubber packing exterior 182. Iron pellets may be formed in the gate 180 that expand the rubber packing exterior 182. When the rubber packing exterior 182 is brought into contact with the slit surface 12 and the inner circumferential surface of the pipe 10, fluid flowing in the existing pipe 10 is stopped. Expansion of the rubber packing exterior 182 helps achieve a solid seal regardless of tuberculation build up within the interior surface of the pipe 10. Exemplary techniques for expanding an outer surface of a gate to achieve an enhanced seal with interior surfaces of a pipe are described further in U.S. Pat. No. 6,283,446, which is hereby incorporated by reference in its entirety.

In the exemplary embodiment shown in FIGS. 7-8, the gate 180 comprises a main blocking segment 181, the rubber packing exterior 182 disposed around a portion of the perimeter of the main blocking segment 181, a stability segment 183 positioned laterally outward near the top of the main blocking segment 181, and another stability segment 185 spaced-apart from the stability segment 183 by a body portion 184. Further, the upper region of the main blocking segment 181 may comprise a taper 186, which is configured to snugly engage an exterior portion of the cut pipe when the gate is closed as shown in FIG. 8A. The gate 180 may further comprise a tapered end segment 187, which facilitates entry into the slit 12 of the pipe 10, and additionally may comprise a tapered segment 188 that facilitates a snug engagement with the cut pipe 10.

The gate 180 is provided within the valve bonnet 170 in a manner that provides enhances stability to the gate 180, particularly when the gate is positioned inside of the pipe 10 as shown in FIGS. 8A-8B. First, the gate 180 is stabilized when at least partially positioned within the slit 12 itself due to a frictional engagement therein. Second, the gate 180 is stabilized due to the stability segment 183 having a tight tolerance relative to the upper housing portion 40, as shown in FIG. 8B. Further, the stability segment 185 has a tight tolerance relative to an interior surface 177 of the valve bonnet 170, as shown in FIG. 8B. Additionally, the actuator 172 provides stability to the gate. By providing enhanced stability segments, the gate is less likely to deflect along the longitudinal axis L of the pipe 10, thereby enhancing sealing functionality within the pipe 10.

Figure 9:
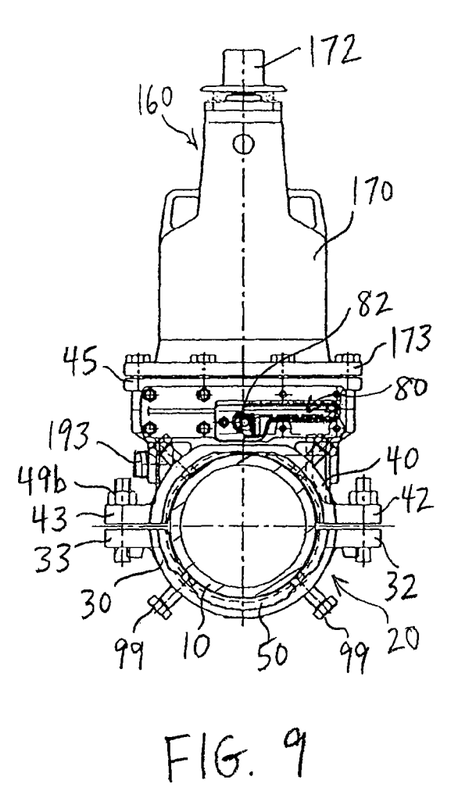
FIG. 9 is a rear view of a sealing housing coupled to an existing pipe, and a valve bonnet coupled to the sealing housing, with selected components shown in cross-section for illustrative purposes.

In accordance with another aspect, a user may leave the valve bonnet 170 with the gate 180 coupled to the sealing housing 20 for longer-term valve insertion, or alternatively, may use the valve bonnet 170 with the gate 180 for a temporary linestop and subsequently remove the valve bonnet 170. As can be seen in FIG. 9, the valve bonnet 170 remains coupled to the sealing housing 20 for longer-term valve insertion, and the gate 180 may be repeatedly opened and closed as many times as desired over a selected period of time or permanently.

Figure 10:
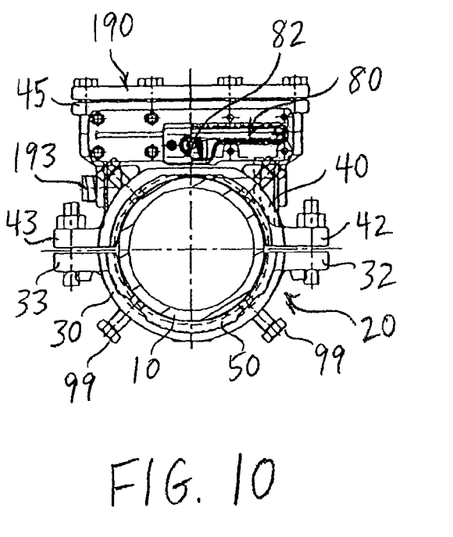
FIG. 10 is a rear view of a sealing housing coupled to an existing pipe, and a blind flange coupled to the sealing housing, with selected components shown in cross-section for illustrative purposes.

However, in FIG. 10, if only a temporary linestop is needed or the user otherwise wishes to remove the valve bonnet 170, then in a first step the gate 180 is retracted within the confines of the valve bonnet 170, as shown in FIGS. 7A-7B. The valve 88 of the integral valve assembly 80 then is closed, as shown in FIG. 5B, via actuation of the feed screw 82, and with flow sealed off, the base portion 173 of the valve bonnet 170 is removed from engagement with the upper surface 45 of the upper housing portion 40. A blind flange 190 then may be secured to the bores 48 in the upper surface 45 of the upper housing portion 40. Advantageously, the user therefore may remove the valve bonnet 170 and use it for other procedures, thereby saving money, particularly when an otherwise short linestop is needed. But since the sealing housing 20 remains engaged to the pipe 10, the blind flange 190 may be replaced with the valve bonnet 170 once again, as needed.

While various embodiments of the invention have been described, the invention is not to be restricted except in light of the attached claims and their equivalents. Moreover, the advantages described herein are not necessarily the only advantages of the invention and it is not necessarily expected that every embodiment of the invention will achieve all of the advantages described.

We claim:

1. A system for use with an existing pipe, the system comprising:
   a sealing housing having a lower housing portion and an upper housing portion, where the lower and upper housing portions are each dimensioned to partially surround an exterior surface of an existing pipe, where the sealing housing extends across at least two outer, spaced apart circumferences of the existing pipe;
   a plurality of sealing members that contact the existing pipe about at least two outer circumferences of the existing pipe at locations spaced apart in the longitudinal direction of the existing pipe to enclose a part of the existing pipe in an airtight state; and
   an integral valve assembly disposed at least partially within an integral valve housing section of the upper housing portion, the integral valve assembly comprising a valve movable between an open position in which the valve provides an open pathway through an opening in an upper surface of the upper housing portion and a closed position in which the valve provides a seal adjacent to the opening,
   wherein the lower and upper housing portions move as a single unit around the existing pipe during a cutting operation forming a slit in the existing pipe when a cutting machine is coupled to the upper housing portion, the system further comprising:
   a travel limiter end ring adapted to be securely mounted around an exterior surface of the existing pipe at an axial location adjacent to the sealing housing, the travel limiter end ring having a main body and first and second end stops, wherein the first and second end stops limit rotational movement of at least a portion of the sealing assembly during the cutting operation.

2. The system of claim 1 wherein the upper housing portion is adapted to selectively receive each of an adapter plate for a cutting machine, a valve bonnet, and a blind flange.

3. The system of claim 1 further comprising:
   a valve bonnet that is adapted to be coupled to the upper housing portion after a slit has been formed in the existing pipe; and
   a gate disposed in the valve bonnet and radially movable relative to the slit in the existing pipe between an open position in which flow is permitted through the existing pipe and a closed position in which flow is inhibited through the existing pipe.

4. The system of claim 3 wherein the valve bonnet and the gate are removable from engagement with the upper housing portion at a time when the valve of the integral valve assembly is in the closed position to inhibit flow through the opening in the upper surface of the upper housing portion.

5. The system of claim 4 further comprising a blind flange that is secured to the upper housing portion after the valve bonnet and the gate are removed from engagement with the upper housing portion.

6. The system of claim 3 wherein, when the gate is in the closed position, the gate comprises a main flow blocking segment disposed at least partially within the existing pipe, a first stability segment that is positioned within the upper housing portion, and a second stability segment that is positioned within an interior surface of the valve bonnet, wherein at least the first and second stability segments reduce longitudinal deflection of the gate relative to the existing pipe.

7. The system of claim 1 further comprising an actuator for moving the valve of the integral valve assembly between the open and closed positions, wherein the actuator is accessible to a user outside of the upper housing portion.

8. The system of claim 7 wherein a linear actuation system is used such that rotation of the actuator imparts a linear movement of the valve to move the valve between the open and closed positions.

9. The system of claim 7 further comprising a travel indicator pin that temporarily attaches to at least a portion of the actuator that is accessible to the user outside of the upper housing portion, wherein the travel indicator pin provides the user with an indication of circumferential rotation of the lower and upper housing portions during the cutting operation.

10. The system of claim 1 further comprising:
    a notched region formed in the main body of the travel limiter end ring between the first and second end stops; and
    a U-gage that is selectively positionable within the notched region of the travel limiter end ring,
    wherein a level position of the sealing housing is ascertained when a protruding component of the sealing housing is disposed within an interior surface of the U-gage.

11. The system of claim 1 wherein the plurality of sealing members are chosen from a kit of sealing members, where each of the sealing members of the kit of sealing members comprises identical outer diameters to fit inside gasket channels of the lower and upper housing portions, and where at least two of the sealing members of the kit of sealing members comprise different inner diameters to accommodate existing pipes of different outer diameters.

12. A system for use with an existing pipe, the system comprising:
    a sealing housing having a lower housing portion and an upper housing portion, where the lower and upper housing portions are each dimensioned to partially surround an exterior surface of an existing pipe, where the sealing housing extends across at least two outer, spaced apart circumferences of the existing pipe;
    a plurality of sealing members that contact the existing pipe about at least two outer circumferences of the existing pipe at locations spaced apart in the longitudinal direction of the existing pipe to enclose a part of the existing pipe in an airtight state;
    an integral valve assembly disposed at least partially within an integral valve housing section of the upper housing portion, the integral valve assembly comprising a valve movable between an open position in which the valve provides an open pathway through an opening in an upper surface of the upper housing portion and a closed position in which the valve provides a seal adjacent to the opening; and
    an actuator for moving the valve of the integral valve assembly between the open and closed positions, wherein the actuator is accessible to a user outside of the upper housing portion,
    wherein the lower and upper housing portions move as a single unit around the existing pipe during a cutting operation forming a slit in the existing pipe when a cutting machine is coupled to the upper housing portion, the system further comprising:

a travel indicator pin that temporarily attaches to at least a portion of the actuator that is accessible to the user outside of the upper housing portion, wherein the travel indicator pin provides the user with an indication of circumferential rotation of the lower and upper housing portions during the cutting operation.

13. The system of claim 12 wherein the upper housing portion is adapted to selectively receive each of an adapter plate for a cutting machine, a valve bonnet, and a blind flange.

14. The system of claim 12 further comprising:

a valve bonnet that is adapted to be coupled to the upper housing portion after a slit has been formed in the existing pipe; and a gate disposed in the valve bonnet and radially movable relative to the slit in the existing pipe between an open position in which flow is permitted through the existing pipe and a closed position in which flow is inhibited through the existing pipe.

15. The system of claim 14 wherein the valve bonnet and the gate are removable from engagement with the upper housing portion at a time when the valve of the integral valve assembly is in the closed position to inhibit flow through the opening in the upper surface of the upper housing portion.

16. The system of claim 15 further comprising a blind flange that is secured to the upper housing portion after the valve bonnet and the gate are removed from engagement with the upper housing portion.

17. The system of claim 14 wherein, when the gate is in the closed position, the gate comprises a main flow blocking segment disposed at least partially within the existing pipe, a first stability segment that is positioned within the upper housing portion, and a second stability segment that is positioned within an interior surface of the valve bonnet, wherein at least the first and second stability segments reduce longitudinal deflection of the gate relative to the existing pipe.

18. The system of claim 12 wherein a linear actuation system is used such that rotation of the actuator imparts a linear movement of the valve to move the valve between the open and closed positions.

19. The system of claim 12 further comprising a travel limiter end ring adapted to be securely mounted around an exterior surface of the existing pipe at an axial location adjacent to the sealing housing, the travel limiter end ring having a main body and first and second end stops, wherein the first and second end stops limit rotational movement of at least a portion of the sealing assembly during the cutting operation.

20. The system of claim 12 wherein the plurality of sealing members are chosen from a kit of sealing members, where each of the sealing members of the kit of sealing members comprises identical outer diameters to fit inside gasket channels of the lower and upper housing portions, and where at least two of the sealing members of the kit of sealing members comprise different inner diameters to accommodate existing pipes of different outer diameters.

* * * * *